TELEPHONE RECORDING SYSTEM

Filed March 14, 1950 2 Sheets-Sheet 1

INVENTOR.
LEO A. MICHELINI
BY
Arlington C. White
ATTORNEY

Oct. 5, 1954 L. A. MICHELINI 2,691,063
TELEPHONE RECORDING SYSTEM
Filed March 14, 1950 2 Sheets-Sheet 2

INVENTOR.
LEO A. MICHELINI
BY
Arlington C. White
ATTORNEY

Patented Oct. 5, 1954 2,691,063

UNITED STATES PATENT OFFICE 2,691,063

TELEPHONE RECORDING SYSTEM

Leo A. Michelini, San Francisco, Calif., assignor of one-third to Luigi Sbrana, San Francisco, Calif., and one-third to Dominico Sciarra, New York, N. Y.

Application March 14, 1950, Serial No. 149,484

2 Claims. (Cl. 179—5.5)

Figure 1:
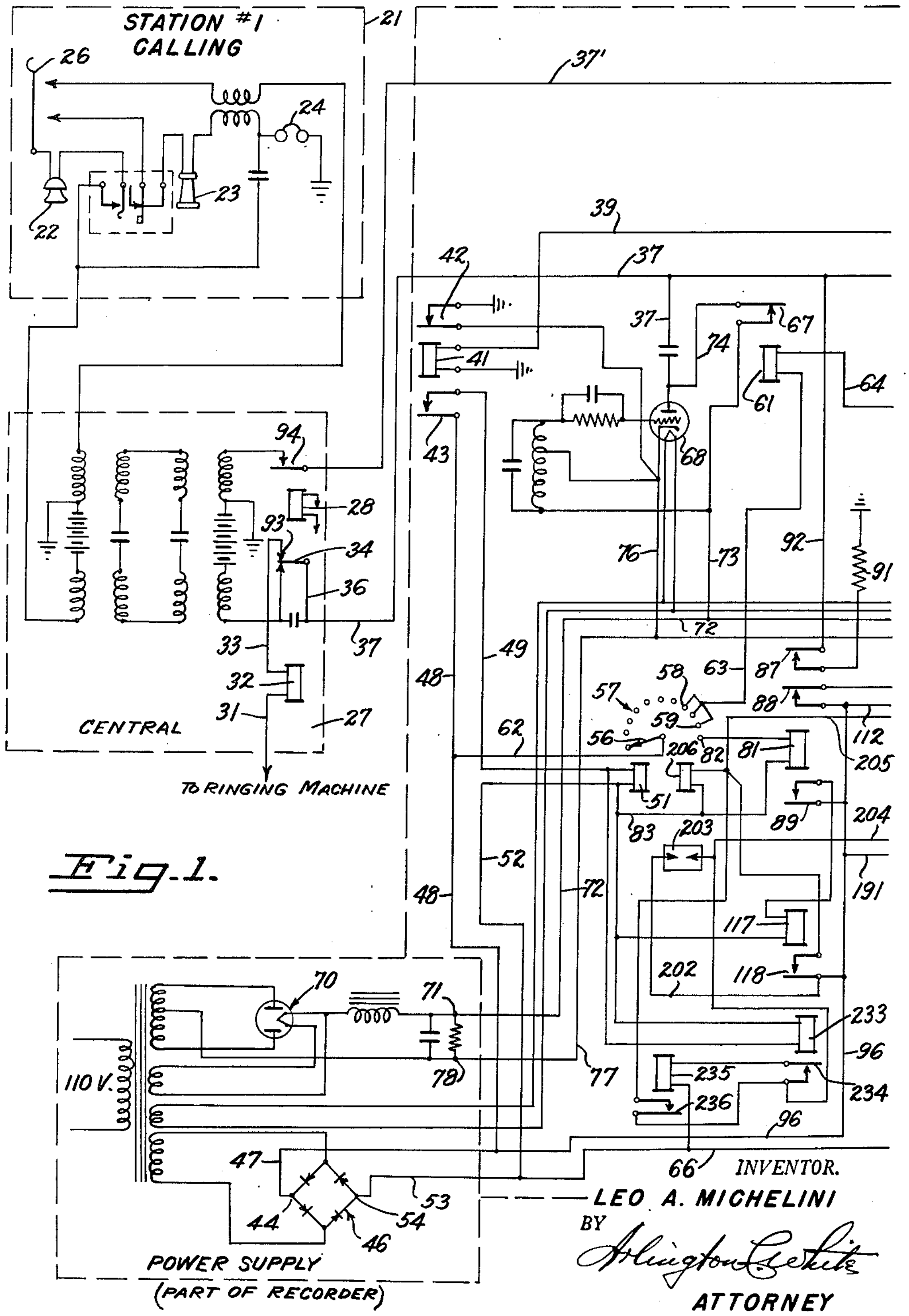

The present invention constitutes an improvement of the invention disclosed and claimed in my co-pending application, entitled "Telephone Recorder," filed October 23, 1947, now United States Letters Patent No. 2,511,865, and with respect to which this application is a continuation-in-part.

As will appear from the aforementioned Letters Patent, the invention therein disclosed and claimed relates to an electrical circuit, a printer device contained in the printer circuit which is interlocked from time to time with the electrical circuit, together with a selector arm connected to a selector switch, and means whereby the selector arm may be moved step by step in response to impulses impressed on the circuits by dialing to effect the printing of a dialed telephone number.

One of the important objects of the present improvement is to provide in a telephone recording system means for notifying a calling party that a printing device is installed at a called station.

Another important object of this improvement is to provide in a telephone recorder system of the indicated nature positive acting means for insuring, without fail, the printing of a dialed telephone number at a called station having a printing device installation.

A still further object of my present improvement is to provide in a telephone recording system of the aforementioned character, means for automatically removing the printing device from the circuit at the expiration of a predetermined time interval.

Other objects of the improvement, together with some of the advantageous features thereof, will appear from the following description of a preferred embodiment thereof which is illustrated in the accompanying drawings. It is to be understood that I am not to be limited to the precise embodiment shown, nor to the precise type, power supply to, or arrangement of the various parts thereof, as my invention, as defined in the appended claims, can be embodied in a plurality and variety of forms and a different power supply employed all within the scope of the present improvement.

Figure 2:
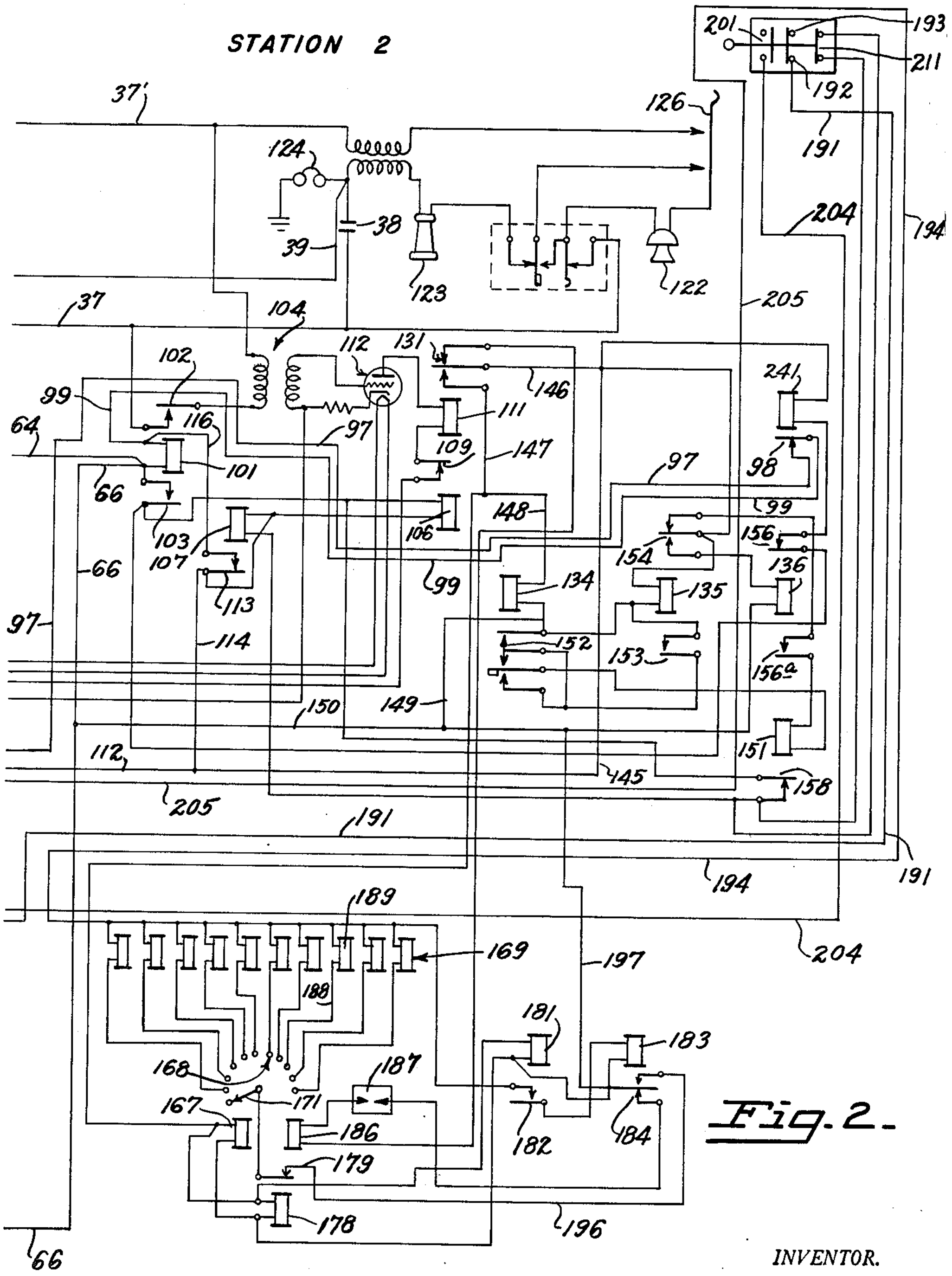

Referring to the drawings:

Figs. 1 and 2, taken together, are diagrammatic views of a preferred embodiment of the present invention.

In its preferred form, my improved telephone recording system preferably comprises, in combination with an automatic dial telephone system including an alternating current circuit and also including a direct current circuit, a printing device contained in an electrical printing circuit superimposed upon said direct current circuit, means for applying a series of impulses at will on said printing circuit to effect the actuation of said printing device, together with an oscillator signal superimposed upon said first-named circuits and operative when direct current only is supplied, and means for automatically removing said printing device from the field of operation under different and particular conditions of telephone use.

As in the case of the invention described and claimed in the aforementioned Letters Patent, it is not deemed necessary to explain the procedures by which a call is completed from a calling to a called station, since the present improvement requires no alteration in any of the dial systems presently in operation, such as panel, cross-bar, Strowger, etc., etc. Moreover, the present improvement likewise employs an automatic central exchange. For purposes of brevity and simplicity, the annexed drawings illustrate two telephones connected to the central exchange, it being clear that a multiplicity of subscribers' telephones may be connected thereto and the improvement is equally applicable to such increased number of telephones.

That portion of my improved telephone recorder system which is illustrated in Fig. 1 includes the calling party station, designated "Station #1" for simplicity, where conventional equipment is installed such as dial mechanism, designated generally by the reference numeral 21, a transmitter 22, a receiver 23 and bells 24. A parallel arrangement for the called station, designated "Station #2," is illustrated in Fig. 2 of the drawings and includes dial mechanism 121, a transmitter 122, a receiver 123, and bells 124.

In conventional telephone systems employing a dialing arrangement, if the party at Station #1 desires to call a party at Station #2, the former merely lifts the receiver 23 from its hook 26 at Station #1, waits for the now familiar dial tone, and then proceeds to dial the telephone number of Station #2 in the usual manner, employing dial mechanism 21, which establishes connections in the automatic central exchange, designated generally by the dotted block showing and reference numeral 27 in Fig. 1, which, in turn, will establish an electrical circuit through bells 124 at Station #2 causing them to ring. Of course, if the party at Station #2 answers the ring, the receiver 123 will be removed from its hook 126 at Station #2 establishing the voice or speaking circuit to enable conversation between the transmitters 22 and 122 and the receivers 23 and 123.

In the event the subscriber at 121 is not at home, the bells 124 at such station, under existing telephone service, would continue to ring until the calling party at 21 considers that no one will answer and thereupon returns the receiver 23 to its hook 26; thus causing the central exchange equipment 27 to return to its initial position. It is obvious that in addition to an inconvenience to the calling party by having to repeat the call later, the telephone company loses a charging fee for the call. However, by virtue of the present improvement, loss of fees to the telephone company and considerable inconvenience to its customers are obviated since provision is made in my improved system for recording the calling party's telephone number at the called subscriber's home or place of business as the case may be, and the called party has a record of all calls, by telephone number, made during the period of absence.

As in the case of my prior invention described in the above identified Letters Patent, with ringing connections established at the central exchange 27, that is, relay 28 being energized, the talking circuit opens and establishes the ringing circuit which is traceable in Figs. 1 and 2 of the drawings. Starting with the ringing machine, not shown, direct current and alternating current, alternately impressed at intervals designated by the telephone company, will flow through wire 31, relay 32, wire 33, normally open contact 34, now closed, wires 36 and 37, condenser 38, and bells 124, see Fig. 2, to ground and back to the grounded side of the ringing machine. Such circuit will cause the bells 124 to ring while the ringing machine is supplying alternating current and to remain silent when supplying direct current. It is established practice to impress both alterating and direct currents on ringing circuits in order to provide for establishment of the talking circuit should the subscriber at the called station 121 answer during either the audible or silent periods of the bells 124. Simultaneously, the alternating current of the ringing circuit also flows through condenser 38, wire 39, see Fig. 2, and relay 41, see Fig. 1, to ground and back to the grounded side of the ringing machine. This will cause relay 41 to energize and deenergize with the ringing of bells 124; such relay operating its contacts 42 and 43 accordingly.

In accordance with the present improvement, the closing of contact 43 by relay 41 establishes a circuit from terminal 44 of the selenium bridge, designated generally by the reference numeral 46, see Fig. 1 of the drawings, through wires 47 and 48, contact 43, now closed, wire 49, relay 51, wires 52 and 53 to opposed contact 54 of the selenium bridge 46. This circuit being established, the relay 51 is energized to cause a switch arm 56 of a selector switch 57 to advance one step; the arm 56 being advanced one step or one position of a series of positions on every ring of the bells 124. If bells 124 continue to ring, switch arm 56 will continue to advance through various positions until it reaches position 58 and a bridging position 59, at which position a circuit for a relay 61 will be completed. This latter circuit is traceable from terminal 44 of selenium bridge 46 over wires 47 and 48, through wire 62, switch arm 56, positions or contacts 58, 59 of selector switch 57, over wire 63 to relay 61, and thence over wires 64 and 66, see Fig. 2, to wire 53 and back to opposed terminal 54 of the selenium bridge 46.

The closing of relay 61 will cause the closing of its normally open contact 67 thereby impressing the plate voltage upon the plate of an oscillator vacuum tube 68 through a circuit traceable from the output of power tube 70 to 71, see Fig. 1, over wires 72 and 73 through contact 67, now closed, over wire 74 through vacuum tube 68, from plate to cathode, over wires 76 and 77 to the other side of the power supply line at 78, see Fig. 1. The impression of this plate voltage will allow vacuum tube 68 to oscillate at a predetermined frequency, and the signal will be superimposed upon the telephone line 37 to ground, back to the cathode side of tube 68, only when the contact 42 of relay 41 is in its normal position as shown in Fig. 1 of the drawings. Since relay 41 is energized only when bells 124 are ringing, it is clear that the oscillator signal effected by oscillator 68 as described, is superimposed on line 37 only when the direct current is being supplied to the ringing circuit, i. e., when the bells 124 are silent. The purpose of the oscillator signal is to inform the calling party at 21 that the called station 121 has a recorder or printing device installation.

In order to eliminate the ringing circuit after a predetermined number of rings, I provide a circuit including a resistor or impedance for effecting a de-energization of relay 28. To this end, I provide a relay 81 and a circuit, associated with selector switch 57, which, in turn, will effect the closing of a second circuit including the above mentioned resistor. As shown in Fig. 1, relay 81 is connected to contact 82 of the selector switch 57 and when selector switch arm 56 reaches contact 82 upon continued ringing of bells 124, the relay 81 is energized since it is connected also to the selenium bridge 46; the complete circuit for relay 81 being traceable from bridge terminal 44 over wires 47, 48 and 62 to switch arm 56, through contact 82, and relay 81, thence over wires 83, 52 and 53 to opposed bridge terminal 54 of selenium bridge 46. This circuit established through relay 81 will effect the closing of normally open contacts 87, 88 and 89 and effect three simultaneous functions, as set out below.

Turning to the functions effected by the closing of contacts 87, 88, 89, and first to the cutting out of the ringing circuit, it will be observed that the closing of contact 87 will establish a circuit including the resistor or impedance 91, see right center of Fig. 1, such circuit being traceable from the ringing machine over wire 31, through relay 32, wire 33 and closed contact 34, over wires 36, 37 and 92 to the closed contact 87, thence through impedance 91 to ground and back to the grounded side of the ringing machine. Due to the high impedance of bells 124, the alternating and direct currents supplied by the ringing machine are so small that the relay 32 normally remains inoperative. However, when the circuit containing impedance 91 is established, as aforesaid, a high current will be caused to flow through relay 32 thereby effecting the operation of its contact 93 and 94 and connecting wires 37 and 37' completely across the central exchange equipment and thus eliminating or cutting out the ringing circuit.

A second function effected by the closing of contacts 87, 88 and 89 of relay 81 is the establishment of a circuit for placing the printer device in position to receive a calling number, and to effect an electrical interlock between such circuit and the main circuit; the former circuit being established by the energization of relay 81 and the closing of its contact 88. This printing device circuit may be traced from selenium bridge terminal 44 over wires 47 and 96 to contact 88, over wire 97 to normally closed contact 98, see Fig. 2, thence over wire 99 through relay 101 and over wires 66 and 53 to opposed bridge terminal 54 of selenium bridge 46.

The energization of relay 101 will actuate its contacts 102 and 103; the closing of normally open contact 102 placing transformer 104 across the telephone lines 37 and 37' and thereby putting the printer device hereinafter described, in a position to receive the calling number. The closing of normally open contact 103 of relay 101 completes the circuits for the relays 106, 107 and 108 and their associated circuits. With respect to relay 106, upon energization it will close its normally open contact 109 thereby impressing a plate voltage through relay 111 upon the plate of the amplifier tube 112.

Upon the energization of relay 107, its normally open contact 113 will close to effect an electrical interlock circuit for relay 101 traceable from selenium bridge terminal 44 over wires 47, 96, 114, through now closed contact 113 of relay 107 over wire 116 through relay 101, thence over wires 66 and 53 back to opposed bridge terminal 54 of selenium bridge 46. This electrical interlock is required to keep relay 101 energized after selector switch arm 56 of selector switch 57 returns to its initial or "home" position.

The third function resulting from the closing of the contacts of relay 81 is that upon the closing of normally open contact 89 of such relay, the relay 117 is energized causing the closing of its normally open contact 118. The closing of contact 118 will energize relay 206 which is the release magnet for selector arm 56 of the selector switch 57 and thereby causing such selector arm 56 to return to its initial or "home" position and, as a result, effecting the de-energization of relay 81. With relay 81 de-energized, its contacts 87, 88, and 89 will return to their normally open positions. These latter circuits can readily be checked by referring to Figs. 1 and 2 of the annexed drawings.

With the circuits provided as hereinabove described, the calling party at Station #1 can now proceed to dial his own telephone number which results in the transmission of a series of impulses from his dial telephone mechanism 25, see dotted line block of Fig. 1, through the central exchange equipment 27 to the recorder device at Station #2. The impulses, or transients, are impressed on the grid of the amplifier tube 112 causing the current flowing through relay 111 to fluctuate in accordance with the signal being impressed on such grid, and it is obvious as a consequence that the contact 131 of relay 111 will respond to and actuate in accordance with the impulses set up by the dial mechanism 25 at Station #1. The closing of normally open contact 131 of relay 111 affords the energization of relays 134, 135 and 136 as hereinafter described, such relays being employed in the system for the purpose of removing the printing device from the telephone lines.

The circuits for energizing the relays 134, 135 and 136 are traceable by reference to Figs. 1 and 2 of the accompanying drawings. For example, and with respect to relay 134, the circuit commences at terminal 44 of selenium bridge 46 and current flows over wires 47, 96, 112, 145, and 146, thence through contact 131 and wires 147 and 148 to relay 134, thence over wires 149, 150, 66 and 53 back to opposed bridge terminal 54 of selenium bridge 46. The energization of relay 134, of course, will actuate its contact 152, and this will cause energization of relay 135 the circuit of which can readily be traced by reference to the drawings. The energization of relay 135 will effect the operation of its contacts 153, and 154; it being understood that the contact 153 is an interlock for the coil circuit of relay 135 while the contact 154 will make possible the energization of relay 136. The energizing of relay 136 will effect the closing of its normally open contact 156 which sets up a circuit for the relay 157 but this only occurs when relay 135 is de-energized thereby allowing its contact 154 to assume the position as illustrated in Fig. 2 of the drawings.

With more specific reference to the relays 134, 135, 136 and 137, hereinabove just alluded to, it should be observed that relay 134 energizes and de-energizes in response to the movement of the contact 131 of relay 111. The contact 152 of relay 104 will, therefore, act in accordance with said relay 134. A review of the annexed drawings clearly shows that relay 135 is energized by the action of contact 152, and relay 135 will then close its interlocking contact 153. It is to be observed that the construction of contact 152 is such that when relay 134 is de-energized, contact 152 vibrates for a predetermined length of time thereby allowing relay 135 to remain energized until such time that the vibrations of contact 152 cease. As hereinabove mentioned, relay 135, through its contact 154, energizes relay 136 which, in turn, through its contact 156 prepares the circuit for relay 157 which, however, can not operate until relay 135 becomes de-energized. It also is to be noted that relay 136 operates its normally closed contact 156*a*, the purpose of which will be described hereinafter. Upon cessation of the vibrations of contact 152, relay 135, being of the sluggish release type and remaining energized for a while longer, finally releases its contacts 153 and 154. Since relay 136 is also of the sluggish release type it will, therefore, hold its contact 156 in the closed position to allow the circuit for relay 157 to be completed and thereafter allow its contact 156 to open. The momentary energization of relay 157 will open its normally closed contact 158 the circuit of which, if traced out, will disclose that such contact 158 will open the circuit for relay 107 causing such relay 107 to de-energize and open its contact 113. The opening of contact 113 will de-energize relay 101 which will then release the contact 102 and open the circuit for transformer 104 and thereby removing the recorder or printing device from the telephone lines 37, 37' leading to the central exchange 27. Simultaneously, the opening of contact 103 of relay 101 will de-energize relay 106 which, in turn, releases its contact 109 and opens the circuit for relay 111.

The closing of the normally open contact of relay 111, besides energizing relay 134, will also energize a relay 167 associated with a selector switch, designated generally by the reference numeral 168. The selector switch 168 is the control for the printing device, generally designated by the reference numeral 169, see Fig. 2 of the drawings, which is only diagrammatically shown and which does not show the printing tape or platen. The energization of relay 167 will cause the switch arm 171 of selector switch 168 to advance to a position corresponding to the impulses sent out by the dial mechanism at Station #1. It is to be observed that a relay 178 is energized simultaneously with the energization of relay 167 but since the relay 178 is of the sluggish release type it will not allow its contact 179 to return to its normal position until a predetermined time has elapsed from the time that the switch arm 171 has come to a stop at a position corresponding to the impulses received by relay 167. Also associated with the printing device, there is provided a relay 181, see Fig. 2, which is made slightly more sluggish in its release action than the action of relay 178, for a purpose hereinafter specified. This relay 181 also is energized simultaneously along with relays 167 and 178. In addition to the foregoing, I provide another relay 183 which is energized by the actuation of contact 182 of relay 181; the energization of relay 183, in turn, actuating its contact 184. There is also associated with the printing device a relay 186 which constitutes a release magnet for selector arm 171 of the selector switch 168. A contact 187 constitutes a part of relay 186 and is in a closed position at all times except when switch arm 171 is at the "home" or initial position. Relay 186 can operate only when the normally closed contact 131 of relay 111 is in its normally closed position and relay 183 has become de-energized by virtue of the de-energization of relay 181.

In order that the actual recording or printing process may be clearly understood, let us assume that the party at Station #1 has dialed the digit 8 which will effect the transmission of 8 impulses to be received by relay 111. By virtue of this series of impulses, contact 131 of relay 111 will be actuated 8 times and, by so doing, will cause relays 134 and 167 to energize and to de-energize 8 times. Inasmuch as the operation of relay 134 has been clearly explained above, its action will not be repeated at this point. However, with relay 167 energizing and de-energizing 8 times, the selector arm 171 of selector switch 168 will be advanced to the position connecting to wire 188, or 8 positions from the "home" position of the selector arm 171. A split second after the eighth and last impulse has been transmitted, relay 178 will de-energize allowing its contact 179 to resume its normally closed position and thereby completing a circuit for the magnet 189 of the printing device 169. The circuit for effecting this result can be traced as follows: Starting with the bridge terminal 44 of selenium bridge 46, see Fig. 1, current will flow over wires 47, 96 and 191 through the normally closed contact 192 of switch 193, see top right of Fig. 2, over wire 194 to magnet 189 of the printing device 169, thence over wire 188 to the switch arm 171 of selector switch 168, through contact 179 and over wire 196 to and through the normally open contact 184, now closed, and thence over wires 197, 150, 66 and 53 back to the opposed bridge terminal 54 of selenium bridge 46, see Fig. 1. It is to be understood that magnet 189, becoming energized, will actuate a pivoted type arm, not shown, causing it to strike a platen, also not shown, over which is automatically fed an ink ribbon and a paper tape, also not shown. It is to be further understood that the type bar of the printing device carries the numeral 8, and that this numeral thereby is imprinted on the paper tape. Shortly after the foregoing function has occurred, relay 181 will also de-energize allowing its contact 182 to open thereby de-energizing the relay 183 and allowing its contact 184 to resume its normal position; namely, as shown on the drawings in Fig. 2 thereof. Contact 184 of relay 183 will then complete the circuit for relay 186 releasing switch arm 171 of the selector switch 168 and allowing said arm to return to its "home" position. This latter circuit can readily be traced out by making reference to the lower portion of Fig. 2 of the annexed drawings. Contact 187, constituting a part of relay 186, is of the normally open type and remains in this position as long as switch arm 171 of selector switch 168 is in its "home" position. However, as soon as switch arm 171 moves away from its "home" position, contact 187 automatically closes. It is also to be understood, although not shown on the accompanying drawings, that when switch arm 187 returns to its "home" position the ink and paper ribbons of the printing device will be automatically advanced one step. Accordingly, the recorder unit or printing device is now ready to receive the next series of impulses, depending upon the digit being dialed by the calling party at Station #1. The operation just described, of course, related to the dialing of the digit 8 and the next and following operations being other digits will cause the selector switch arm 171 of the selector switch 168 to assume other positions and thereby cause energization of one or another of the printing magnets located adjacent to the magnet 189 hereinabove referred to, and repeating the process of operations as hereinabove described for the digit 8. When the subscriber at Station #1 has dialed the last digit of his own telephone number, he returns the receiver 23 of his telephone to its hook 26 and the telephones at Stations #1 and #2 will thereafter be disconnected from the central equipment 27 in the conventional manner as now used in automatic telephone systems. This function of terminating connections needs no further explanations since those skilled in the art are well versed in the manner in which it is accomplished.

In accordance with the present invention, I have provided in the present improvement means for automatically disengaging the printing device in the event that the party at Station #2, that is to say the called party, should return and answer his telephone while the printing device is being operated, thereby allowing conversation to take place between Station #1 and Station #2 in the usual manner. While only shown schematically at the top right of Fig. 2 of the drawings, the switch 193 is so mounted in relation to the hook arm 126 at Station #2 that the switch 193 is actuated by such hook arm. The actuation of switch 193 establishes the talking circuit, whenever the party at Station #2 answers while the printing device is being operated as mentioned above, and at the same time automatically disengaging the printing device in such event. The talking circuit established by the actuation of switch 193 may be traced from the bridge terminal 44 of selenium bridge 46, see Fig. 1, it being understood that the normally open contact 201 of switch 193 closes when the switch hook 126 is removed. Starting, then, at bridge terminal 44 of selenium bridge 46, current will flow over wires 47, and 96 to the lower portion of normally open contact 118, thence over wire 202 to the normally open contact 203 which is closed for any position of the switch arm 56 of selector switch 57 except when in the "home" position, thence over wire 204, see Figs. 1 and 2, to the now closed normally open contact 201 of switch 193, thence over wire 205, see Figs. 2 and 1, through the release relay 206 for selector switch 57, thence over wires 83, 52 and 53 back to the opposed bridge contact 54 of selenium bridge 46. This circuit will then allow the release relay 206 to operate and allow switch arm 56 of selector switch 57 to return to its "home" position. As previously described, selector arm 56 of the selector switch 57 will advance one step for every ring of the bells 124. Therefore, should the party at Station #2 arrive and answer while bells 124 are ringing, some means must be provided to re-set the selector arm 56 to its "home" position so that it can be ready for any future calls. The actuation of normally open contact 201 of the switch 193, as just described, attains this object.

Another function of the switch 193, as indicated above, is to take the printing device out of operation when the party at Station #2 answers while the printing device is in operation. In this respect, it will be observed that the normally closed switch contact 192 of switch 193 will open when the switch arm 126 at Station #2 is taken from its hook, thereby opening the circuit for the printing magnets of which the magnet 199 is designated in the drawings. This action will avoid any unnecessary printing of numbers which possibly would be confusing if printed.

Another function of the switch 193, in association with the receiver 123 and its removal from the hook 126, is to remove the printing device entirely from the telephone lines 37 and 37'. In this connection, the normally closed contact 211 of the switch 193 will open when the receiver 123 at Station #2 is lifted from its hook 126 thereby opening the circuit for the relay 107 which is the electrical interlock for relay 101. This circuit can readily be traced by making reference to Fig. 2 of the drawings. With relay 107 de-energized, its contact 113 will open thus opening the circuit for relay 101 which, in turn, will remove the printing device from the telephone lines 37 and 37'. If the selector arm 171 of selector switch 168 is in any position other than its "home" position, it will automatically be caused to return to its "home" position by the release relay 186. Again, the circuit can readily be followed by referring to the drawings.

It is to be observed that the three actions or functions, just alluded to, take place simultaneously and regardless of the stage of printing; the printing may even be in a stage of operation at the time that the called party at Station #2 answers at which time, as just described, the talking circuit will be established between the calling and the called stations.

In accordance with the present improvement, I have made provision for disengaging the printing device if, for any reason whatsoever, the calling party at Station #1 decides not to leave a record of his telephone number at Station #2, and also to return the system to its initial position in order that it may respond readily to future calls. As previously described, for every ring of the bells 124 at Station #2, the selector arm 56 of selector switch 57 will advance one position. Therefore, assuming that the party at Station #1 to hang up before the selector arm reaches the final position 59 of selector switch 57, it is necessary to provide for the return of the selector arm 56 to its "home" position in order that the system be conditioned for future calls. This I accomplish in the provision of the following circuits. As mentioned above, upon every ring of the bells 124 at Station #2, relay 41 will operate its contact 42 and 43; contact 43 causing the energization of relay 51, the function of which has already been described. However, in addition to the energization of relay 51 associated with selector switch 57, I also provide a relay 233 which is energized upon the actuation of contact 43 of relay 41 and thus effect the opening of the normally closed contact 234 of relay 233, thereby opening a circuit for relay 235 which preferably is of the time-delay acting type, either thermal or otherwise. With reference to Fig. 1 of the drawings, it can readily be seen that the circuit for relay 233 also leads through contact 203 which is in the closed position for any position of selector arm 56 of selector switch 57 excepting the "home" position. It is to be understood that the breaking of the circuit for relay 235 by contact 234 will prevent of course the operation of relay 235. After cessation of operation of relay 41 and relay 233, the contact 234 of relay 233 will return to its normally closed position and a completed circuit for relay 235 is established. After a predetermined interval of time has elapsed, relay 235 will operate its normally open contact 236 and thereby the energization of the release relay 206, and such relay will allow selector arm 56 of the selector switch 57 to return to its "home" position. With the selector arm 56 back at its "home" position, contact 203 de-energizes relay 235 and causes its contact 236 to resume its normally open position, thus allowing selector switch 57 and its arm 56 to be in a position to respond to future calls.

As indicated above, means are provided to remove the printing device from the telephone lines after the party at Station #1 has effected the placement of the printing device at Station #2 across the telephone lines and then decides not to leave any record at Station #2. It is to be understood, of course, under normal operations of my improved telephone recorder system, after a number or a series of numbers have been dialed the operation of relays 134, 135 and 136 would automatically disengage the printing device after the last pulsation had been transmitted but, in the event of the indicated contingency the party at Station #1 does not transmit any pulsations, the means hereinafter alluded to come into operation. The means which I allude to include a time-delay relay 241, see Fig. 2 of the drawings, which may be thermal or otherwise. Upon the energization of relay 101, hereinabove described, and the closing of its normally open contact 103, a circuit is completed for relay 241 and readily traceable by reference to Fig. 2 of the drawings. After a predetermined time has elapsed, relay 241 will actuate its normally closed contact 156 which will open the circuit for relay 101. The de-energization of relay 101 will cause the opening of its contact 103 which will cause relays 106, 107 and 241 to de-energize and also cause the opening of its other normally open contact 102 which will disengage the printing device from the telephone lines 37 and 37'. This will set up the printing device for any subsequent calls that may come along. The function of normally closed contact 156a of relay 136 is to open the circuit for relay 241 only when pulsations have been transmitted by the party at Station #1, in which case the operation of relay 241 is not needed, as herein above explained.

From the foregoing, it is readily observed that the printing device, generally designated in Fig. 2 of the drawings by the reference numeral 169, is automatically engaged across the telephone lines 37 and 37′ to receive the record of the calling number. Moreover, the printing device is automatically disengaged from the lines 37 and 37′ in the event the party at the called station answers his telephone during the ringing of the bells 124, or during any stage of the printing operation. Furthermore, the printing device is automatically disengaged from the telephone lines should the party at Station #1 hang up prior to the arrival of the selector arm 56 of the selector switch 57 to its final advanced position 59. In addition, the printing device is automatically disengaged from the telephone lines should the party at the calling station hang up after the printing device has been placed in a receiving condition but no impulses are transmitted by the party at Station #1 or, that is to say, should the party at Station #1 fail to make use of the dial mechanism 25 to dial his number.

It is also to be noted that the present improvement includes an audible signal, operative upon the expiration of a predetermined number of rings of bells 124, to inform the calling party through his receiver 23, that the called station has a printing device installation. This audible signal automatically is placed on the line through the medium of the oscillator tube 68, and its accompanying circuit. As stated above, the oscillator 68 operates only when the bells 124 are silent and upon direct current only. Obviously, if the calling party at Station #1 does not receive the audible signal, he knows that no printing device is installed at the called station and naturally returns his receiver to its hook 26 after waiting a normal time for the party at Station #2 to answer the ringing of bells 124.

It is to be understood that the appended claims are to be accorded a range of equivalence commensurate in scope with the advance made over the prior art.

I claim:

1. The combination with an automatic dial telephone system including dial mechanism and also including an electrical circuit upon which alternating current and direct current are alternately impressed at predetermined intervals and also including call bells in the circuit which are caused to ring on alternating current supplied to the circuit upon actuation of the dial mechanism and caused to remain silent on direct current supply to the circuit and also including a talking circuit, of a telephone recording system comprising a printing device, an auxiliary electrical circuit containing said printing device, means electrically interlocking said auxiliary circuit with the electrical circuit of the automatic dial telephone system, a signal circuit connected to the electrical circuit of the automatic dial telephone system, an audible signal in said signal circuit, and means connected to and actuated upon the impression of a direct current on the electrical circuit of the automatic dial telephone system for effecting the energization of said signal circuit to cause the actuation of said audible signal thereby to inform a calling party of the presence of a printing device in the system at the station of the called party, and means for preventing the ringing of the call bells of the system after a predetermined time interval while simultaneously retaining said auxiliary circuit containing said printing device interlocked with the electrical circuit of the system.

2. The system defined in claim 1 and including an oscillator tube in said signal circuit, and control means connected to said oscillator tube as well as connected to the electrical circuit of the automatic dial telephone system to withhold actuation of said oscillator tube until the expiration of a predetermined time interval.

References Cited in the file of this patent

UNITED STATES PATENTS

| Number | Name | Date |
|---|---|---|
| 1,577,869 | Podolsky | Mar. 23, 1926 |
| 1,793,761 | Tilden et al. | Feb. 24, 1931 |
| 1,810,865 | Warwick | June 16, 1931 |
| 1,887,588 | Elkins | Nov. 15, 1932 |
| 1,952,280 | Parker | Mar. 27, 1934 |
| 1,975,207 | Getz et al. | Oct. 2, 1934 |